(12) United States Patent
Bennett

(10) Patent No.: US 7,215,504 B1
(45) Date of Patent: May 8, 2007

(54) DISK DRIVE USING AN OPTICAL SENSOR TO DETECT A POSITION OF AN ACTUATOR ARM

(75) Inventor: George J. Bennett, Murrieta, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/253,400

(22) Filed: Oct. 19, 2005

(51) Int. Cl.
*G11B 5/596* (2006.01)

(52) U.S. Cl. .................................. 360/78.11; 360/77.03

(58) Field of Classification Search ...................... None
See application file for complete search history.

(56) References Cited

U.S. PATENT DOCUMENTS

| | | | |
|---|---|---|---|
| 3,806,254 A * | 4/1974 | Ha et al. ...................... 356/395 |
| 4,516,177 A | 5/1985 | Moon et al. |
| 4,967,291 A | 10/1990 | Touchton et al. |
| 4,974,109 A | 11/1990 | Hoshimi et al. |
| 5,227,930 A * | 7/1993 | Thanos et al. ........... 360/78.04 |
| 5,426,545 A | 6/1995 | Sidman et al. |
| 5,442,172 A * | 8/1995 | Chiang et al. .......... 250/237 G |
| 5,459,383 A | 10/1995 | Sidman et al. |
| 5,471,304 A | 11/1995 | Wang |
| 5,471,734 A | 12/1995 | Hatch et al. |
| 5,563,868 A | 10/1996 | Farnsworth et al. |
| 5,619,387 A | 4/1997 | Ottesen et al. |
| 5,666,236 A | 9/1997 | Bracken et al. |
| 5,831,786 A | 11/1998 | Boutaghou et al. |
| 5,856,895 A | 1/1999 | Schaenzer et al. |
| 6,052,250 A | 4/2000 | Golowka et al. |
| 6,054,833 A | 4/2000 | Takeuchi |
| 6,064,540 A | 5/2000 | Huang et al. |
| 6,072,655 A | 6/2000 | Uwabo et al. |
| 6,100,623 A | 8/2000 | Huang et al. |
| 6,128,155 A | 10/2000 | Sugawara et al. |
| 6,157,522 A | 12/2000 | Murphy et al. |
| 6,169,382 B1 | 1/2001 | McKenzie et al. |
| 6,310,746 B1 | 10/2001 | Hawwa et al. |
| 6,396,652 B1 | 5/2002 | Kawachi et al. |
| 6,407,876 B1 | 6/2002 | Yamaguchi et al. |
| 6,515,834 B1 | 2/2003 | Murphy |
| 6,542,326 B1 | 4/2003 | Ell et al. |
| 6,563,660 B1 | 5/2003 | Hirano et al. |

(Continued)

OTHER PUBLICATIONS

UDT Sensors Inc., "Non-contact optical position sensing using silicon photodetectors", App Note No. 13, Apr. 1982, http://www.udt.com.

(Continued)

*Primary Examiner*—Andrew L. Sniezek
(74) *Attorney, Agent, or Firm*—Jason T. Evans, Esq.; Howard H. Sheerin, Esq.

(57) ABSTRACT

A disk drive is disclosed comprising a disk, an actuator arm, a head coupled to the actuator arm, a base, and an optical sensor operable to detect a position of the actuator arm. The optical sensor comprises a light source that is stationary relative to the base, a plurality of light sensitive sensors positioned to receive light from the light source, and a substantially opaque element positioned between the light source and the light sensitive sensors configured to control an amount of light at least one of the plurality of light sensitive sensors detects relative to the position of the actuator arm.

30 Claims, 8 Drawing Sheets

U.S. PATENT DOCUMENTS

| | | |
|---|---|---|
| 6,583,964 B1 | 6/2003 | Huang et al. |
| 6,603,629 B1 | 8/2003 | Tsai |
| 6,604,431 B1 | 8/2003 | Soga et al. |
| 6,614,613 B1 | 9/2003 | Huang et al. |
| 6,618,217 B2 | 9/2003 | Heaton et al. |
| 6,618,218 B1 | 9/2003 | Kadowaki et al. |
| 6,621,653 B1 | 9/2003 | Schirle |
| 6,624,983 B1 | 9/2003 | Berding |
| 6,631,047 B2 | 10/2003 | Ishizuka et al. |
| 6,674,600 B1 | 1/2004 | Codilian et al. |
| 6,690,551 B2 | 2/2004 | Shiraishi et al. |
| 6,697,211 B2 | 2/2004 | Koganezawa |
| 6,707,632 B1 | 3/2004 | Raphael et al. |
| 6,747,834 B1 | 6/2004 | Matsuyama |
| 6,791,784 B2 | 9/2004 | Edwards |
| 6,798,609 B1 | 9/2004 | Bonin et al. |
| 6,816,334 B2 | 11/2004 | Watanabe et al. |
| 6,888,694 B2 | 5/2005 | Guo et al. |
| 6,914,745 B2 | 7/2005 | Takeuchi et al. |
| 6,924,958 B2 | 8/2005 | Vigna et al. |
| 6,934,117 B2 | 8/2005 | Huang et al. |
| 7,002,771 B2 * | 2/2006 | Christie et al. ......... 360/77.12 |
| 2002/0054451 A1 | 5/2002 | Moon et al. |
| 2002/0109931 A1 | 8/2002 | Vigna et al. |
| 2003/0053244 A1 | 3/2003 | Lewis |
| 2003/0133219 A1 | 7/2003 | Ishizuka et al. |
| 2003/0147181 A1 | 8/2003 | Shiraishi et al. |
| 2004/0001280 A1 | 1/2004 | Ikedo et al. |
| 2004/0051993 A1 | 3/2004 | Shin |
| 2004/0246833 A1 | 12/2004 | Ehrlich |
| 2006/0119977 A1 * | 6/2006 | Zhu et al. ................ 360/77.03 |

OTHER PUBLICATIONS

M. Kobayashi et al., "Multi-Sensing Servo with Carriage-Acceleration Feedback for Magnetic Disk Drives", Proceeedings of the American Control Conference, Jun. 1998, pp. 3038-3042.

F. Y. Huang et al., "Active Damping in HDD Actuator", IEEE Transactions on Magnetics, vol. 37, No. 2, Mar. 2001, pp. 847-849.

* cited by examiner

DISK DRIVE USING AN OPTICAL SENSOR TO DETECT A POSITION OF AN ACTUATOR ARM

BACKGROUND OF THE INVENTION

1. Field of the Invention

The present invention relates to disk drives for computer systems. More particularly, the present invention relates to a disk drive using an optical sensor to detect a position of an actuator arm.

2. Description of the Prior Art

FIG. 1 shows an exploded view of a prior art disk drive comprising a disk 2 rotated by a spindle motor 4, and a head 6 coupled to a distal end of an actuator arm 8 which is rotated about a pivot 10 by a voice coil motor (VCM) in order to actuate the head 6 over the disk 2. The disk 2, spindle motor 4, head 6, actuator arm 8, and VCM are enclosed in a head disk assembly (HDA) comprising a base 9 and a cover 11. The VCM comprises a voice coil 12 coupled to the base of the actuator arm 8 and one or more permanent magnets attached to a yoke 14. When the voice coil 12 is energized with current, the resulting magnetic flux interacts with the magnetic flux of the permanent magnets to generate a torque that rotates the actuator arm 8 about the pivot 10. A tang 16 attached to the actuator arm 8 interacts with a crash stop 18 to limit the stroke of the actuator arm 8, and also provides a latching mechanism (e.g., using a magnet) to maintain the actuator arm 8 in a latched position while the disk drive is powered down. Alternatively, the actuator arm 8 may be parked on a ramp located at the outer periphery of the disk 2 when the disk drive is powered down.

The disk 2 typically comprises embedded servo sectors recorded at a periodic interval around the disk 2 which provide coarse position information (e.g., a track address) used to seek the head 6 to a target track, and fine positioning information (e.g., servo bursts) used to maintain the head 6 over the target track during read/write operations. Control circuitry within the disk drive processes the position information detected from the servo sectors to implement a position controlled servo system during normal operation. During transition modes, such as unlatch or ramp-load during power on and latch or ramp-unload during a power failure, the position information is unavailable from the servo sectors. For these modes, prior art disk drives typically process the back EMF voltage generated by the VCM to estimate a velocity of the actuator arm 8, and the control circuitry processes the estimated velocity to implement a velocity controlled servo system. However, estimating the velocity of the actuator arm 8 by evaluating the back EMF voltage requires expensive analog circuitry which can typically provide only a crude estimate due to the mechanical variations of the VCM (e.g., the resistance of the voice coil 12). In addition, the back EMF voltage is typically very small at low speed requiring low driving voltages and undesirable inefficiencies, particularly if the driving voltage is generated from the momentum of the spindle motor 4 during a power failure.

There is, therefore, a need to detect the position (and/or velocity) of an actuator arm in a disk drive more effectively, for example, during transition modes (e.g., power on/off, etc.) when the position information from the embedded servo sectors is unavailable.

SUMMARY OF THE INVENTION

An embodiment of the present invention comprises a disk drive having a disk, an actuator arm, a head coupled to the actuator arm, a base, and an optical sensor operable to detect a position of the actuator arm. The optical sensor comprises a light source that is stationary relative to the base, a plurality of light sensitive sensors positioned to receive light from the light source, and a substantially opaque element positioned between the light source and the light sensitive sensors configured to control an amount of light at least one of the plurality of light sensitive sensors detects relative to the position of the actuator arm.

In one embodiment, the opaque element is coupled to the actuator, and the light sensitive sensors are stationary relative to the base. In one embodiment, the opaque element comprises a linear element having a sloping angle with respect to the actuator arm.

In another embodiment, the disk drive further comprises control circuitry for adjusting an intensity of the light in response to the light sensitive sensors. In one embodiment, the plurality of light sensitive sensors comprise a first sensor and a second sensor, and the disk drive further comprises a differential amplifier operable to compute a difference between a first amount of light detected by the first sensor and a second amount of light detected by the second sensor, wherein the difference represents the position of the actuator arm. In another embodiment, the differential amplifier is further operable to compute a sum of the first amount of light detected by the first sensor and the second amount of light detected by the second sensor, wherein an intensity of the light is controlled in response to the sum.

In still another embodiment, the light sensitive sensors and opaque element are aligned substantially horizontally with respect to the surface of the disk. In an alternative embodiment, the light sensitive sensors and opaque element are aligned substantially vertically with respect to the surface of the disk.

In another embodiment, the disk, head, and actuator arm are enclosed in a head disk assembly (HDA), wherein the HDA comprises the base, a cover, and a window, wherein the light passes through the window. In one embodiment, the light sensitive sensors are located inside the HDA, and in another embodiment, the light sensitive sensors are located outside the HDA.

In still another embodiment, the light source comprises a light emitting device and a mirror. In an alternative embodiment, the light source comprises a light pipe.

Another embodiment of the present invention comprises a method of detecting a position of an actuator arm in a disk drive, the disk drive comprising a disk, an actuator arm, a head coupled to the actuator arm, a voice coil motor operable to rotate the actuator arm about a pivot, and a base. A light source that is stationary relative to the base generates light, and a plurality of light sensitive sensors detect the light. An opaque element positioned between the light source and the light sensitive sensors controls an amount of light at least one of the plurality of light sensitive sensors detects relative to a position of the actuator arm.

DESCRIPTION OF THE PREFERRED EMBODIMENTS

Figure 2:
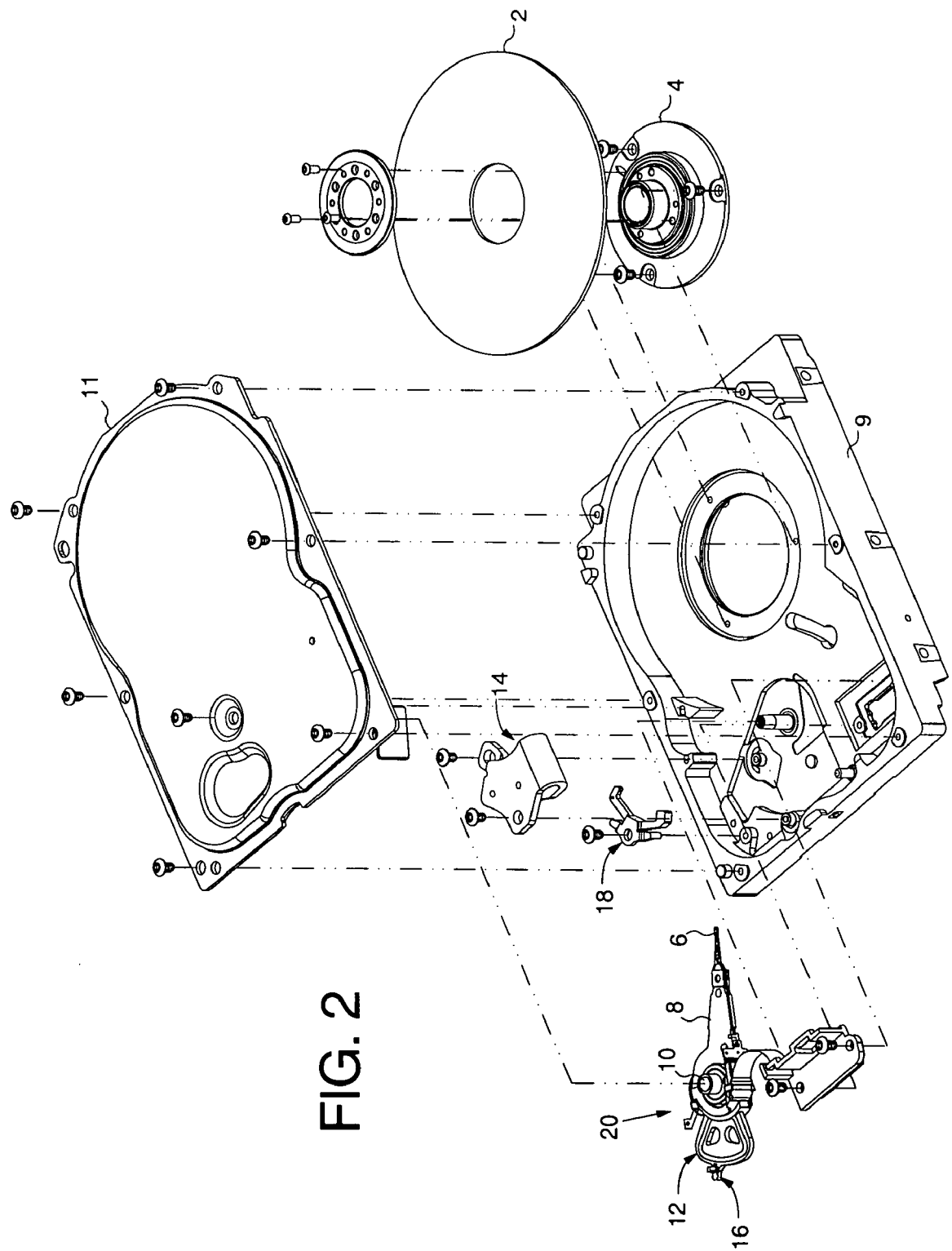
FIG. 2 shows a disk drive according to an embodiment of the present invention comprising an optical sensor for detecting a position of the actuator arm.

FIG. 2 shows a disk drive according to an embodiment of the present invention comprising a disk 2, an actuator arm 8, a head 6 coupled to the actuator arm 8, a base 9, and an optical sensor 20 operable to detect a position of the actuator arm 8. The optical sensor 20 comprises a light source that is stationary relative to the base 9, a plurality of light sensitive sensors positioned to receive light from the light source, and a substantially opaque element positioned between the light source and the light sensitive sensors configured to control an amount of light at least one of the plurality of light sensitive sensors detects relative to the position of the actuator arm 8.

Figure 1:
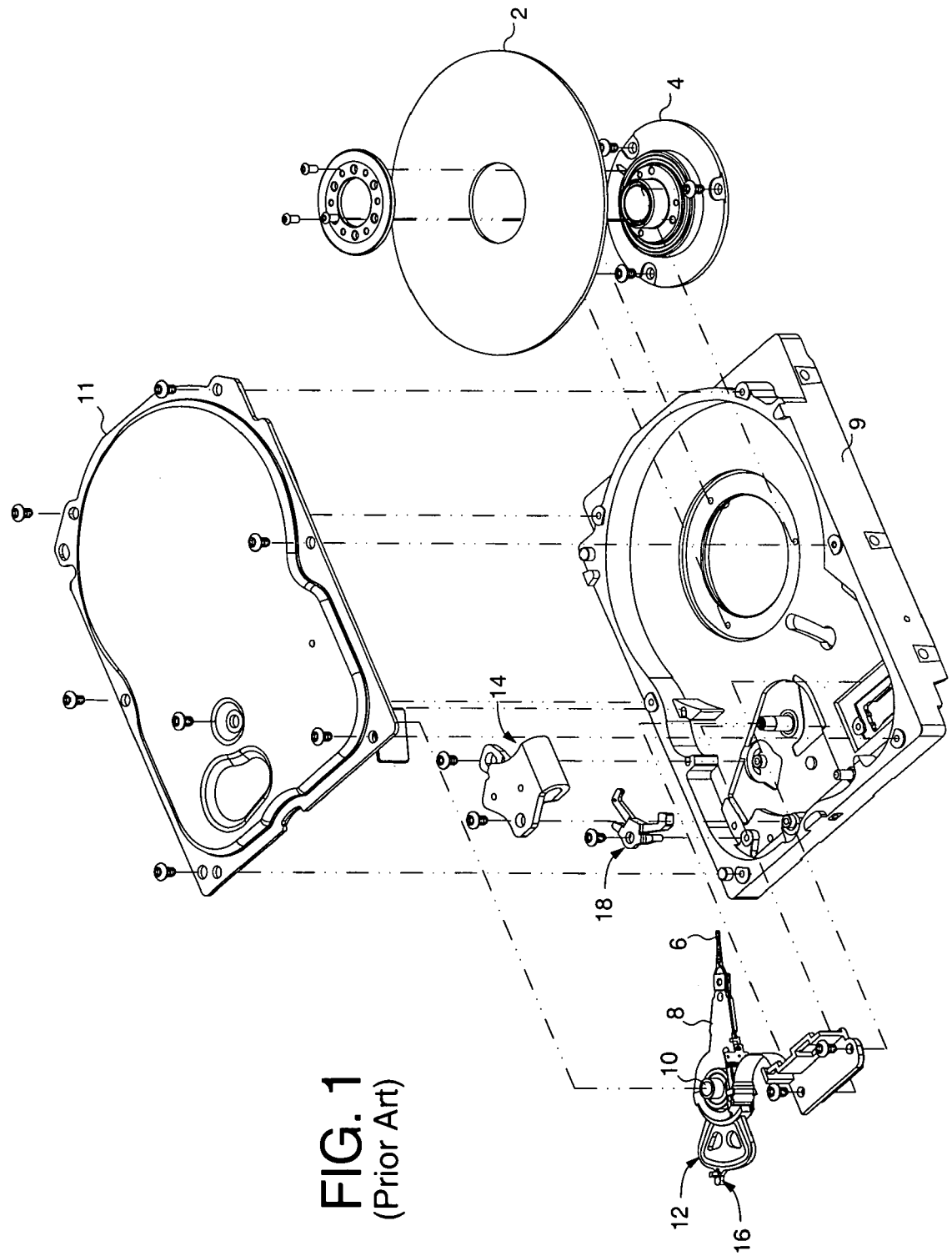
FIG. 1 shows a prior art disk drive comprising a disk, a head attached to an actuator arm, and a VCM for rotating the actuator arm about a pivot in order to position the head over the disk.

Similar to the prior art disk drive of FIG. 1, the disk drive shown in the embodiment of FIG. 2 comprises a spindle motor 4 for rotating the disk 2, and a VCM for rotating the actuator arm 8 about a pivot 10 to position the head 6 over the disk 2. The VCM comprises a voice coil 12 coupled to the base of the actuator arm 8 and one or more permanent magnets attached to a yoke 14. When the voice coil 12 is energized with current, the resulting magnetic flux interacts with the magnetic flux of the permanent magnets to generate a torque that rotates the actuator arm 8 about the pivot 10. A tang 16 attached to the actuator arm 8 interacts with a crash stop 18 to limit the stroke of the actuator arm 8, and also provides a latching mechanism (e.g., using a magnet) to maintain the actuator arm 8 in a latched position while the disk drive is powered down. Alternatively, the actuator arm 8 may be parked on a ramp mounted at the outer periphery of the disk 2 when the disk drive is powered down. The disk 2, spindle motor 4, head 6, actuator arm 8, crash stop 18, and VCM are enclosed in an HDA comprising a base 9 and a cover 11.

Figure 3:
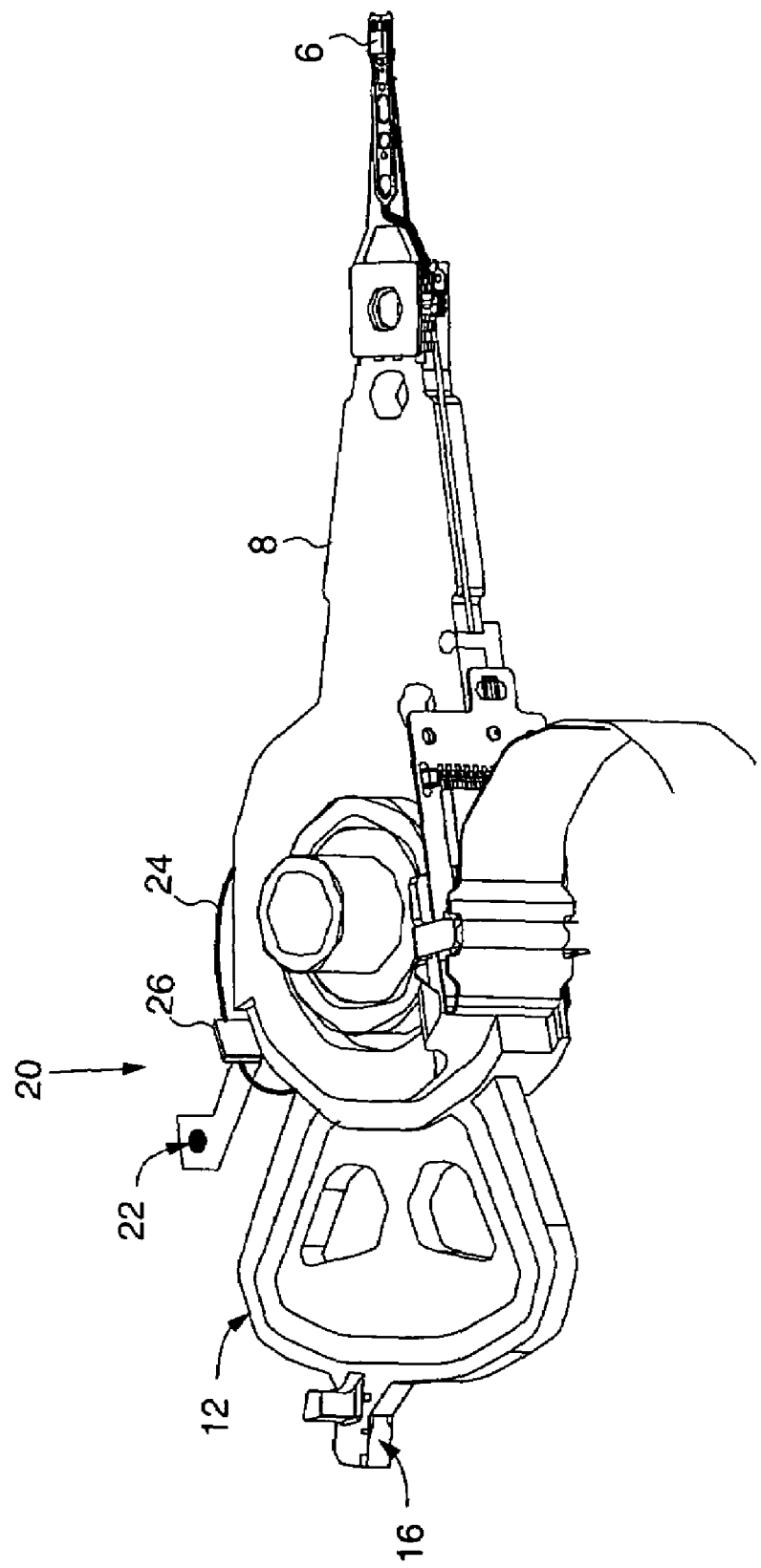
FIG. 3 shows an actuator arm according to an embodiment of the present invention wherein the optical sensor comprises a light source, a plurality of light sensitive sensors, and an opaque element positioned between the light source and the light sensitive sensors.

FIG. 3 shows further details of an actuator arm 8 and optical sensor 20 according to an embodiment of the present invention. The light source comprises a light emitting device 22, such as a light emitting diode (LED) that is stationary relative to the base 9. The opaque element 24 comprises a linear element, such as a wire, coupled to the actuator arm 8. The light emitting device 22 and light sensitive sensors 26 are aligned substantially horizontally with respect to the surface of the disk 2 (and the planar surface of the actuator arm 8). The light sensitive sensors 26 are stationary relative to the base 9 such that the opaque element 24 moves with the actuator arm 8 relative to the light sensitive sensors 26, thereby changing the amount of light each light sensitive sensor 26 detects.

Figure 4A:
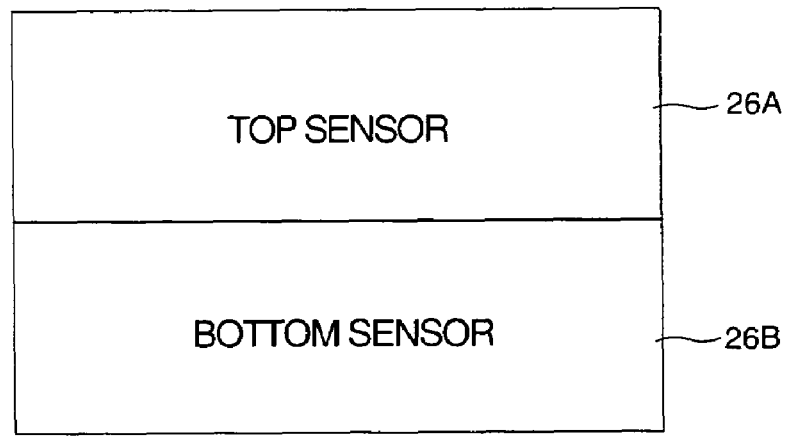
FIG. 4A shows an embodiment of the present invention wherein the plurality of light sensitive sensors comprise top and bottom sensors.

In the embodiment of FIG. 3, the light sensitive sensors 26 comprise a top sensor 26A and a bottom sensor 26B as illustrated in FIG. 4A. Any suitable light sensitive sensor 26 may be employed in the embodiments of the present invention, such as a photo resistor, a charge-coupled device (CCD), a CdS/CdSe photo sensor, or a silicon based photovoltaic cell (photodiode). A light sensitive sensor 26 having a high bandwidth (e.g., a photovoltaic cell) may be preferred depending on the application. The light sensitive sensors 26A and 26B are shown adjacent one another in the embodiment of FIG. 4A, and may be integrated into a single component (e.g., separate regions of a CCD or CdS/CdSe photo sensor). In an alternative embodiment, the light sensitive sensors 26A and 26B may be manufactured as separate components and may also be separated by any suitable distance.

Figure 4B:
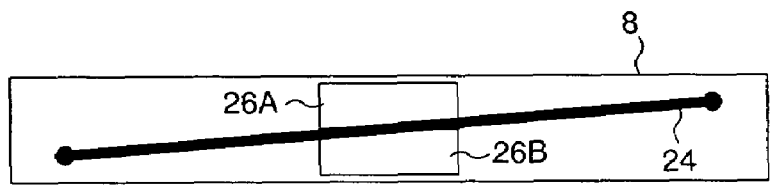
FIGS. 4B–4D illustrate how the opaque element controls the amount of light each sensor detects relative to the position of the actuator arm according to an embodiment of the present invention.
Figure 4C:
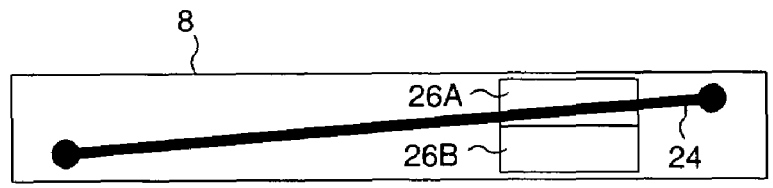
Figure 4D:
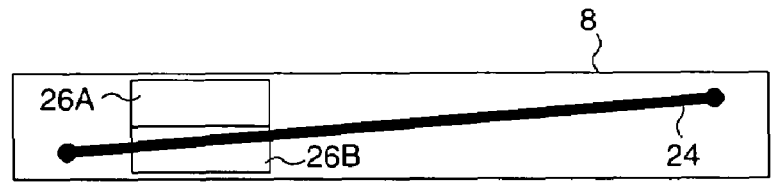

Operation of the optical sensor 20 shown in FIG. 3 is illustrated in FIGS. 4B–4D, which show a side view of the actuator arm 8 from the perspective of the light emitting device 22 looking toward the light sensitive sensors 26A and 26B. In this embodiment, the opaque element 24 (a linear element) has a sloping angle with respect to the actuator arm 8. In FIG. 4B, the actuator arm 8 is positioned near the middle of its stroke such that each light sensitive sensor 26A and 26B receives an equal amount of light. In FIG. 4C, the actuator arm 8 is rotated in one direction (e.g., toward the OD) such that the bottom sensor 26B receives more light than the top sensor 26A, and in FIG. 4D the actuator arm 8 is rotated in the opposite direction (e.g., toward the ID) such that top sensor 26A receives more light than the bottom sensor 26B.

Although the opaque element 24 is shown in the embodiment of FIG. 3 as comprising a linear element having a sloping angle, the opaque element 24 may comprise any suitable shape, such as a planar shape. In another embodiment, the opaque element 24 may comprise one or more apertures for controlling an amount of light passing through the opaque element 24. In addition, the opaque element 24 may comprise any suitable orientation with respect to the actuator arm 8 and light sensitive sensors 26. For example, the opaque element 24 may be curved rather than linear.

Figure 5A:
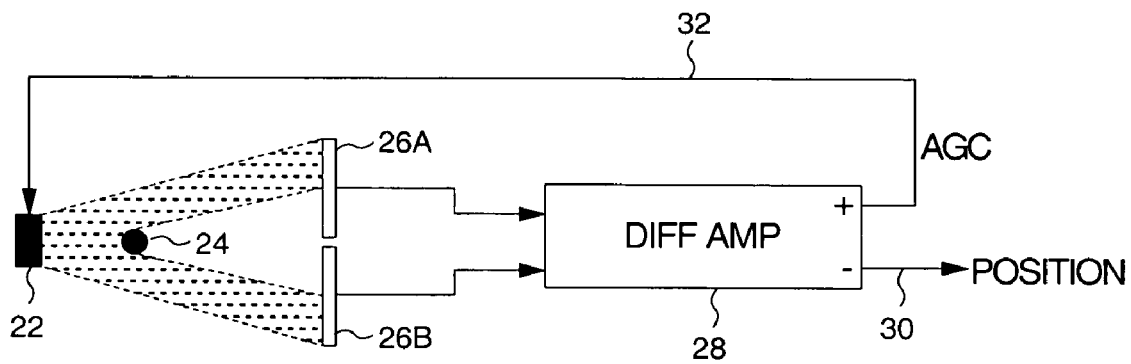
FIG. 5A shows an embodiment of the present invention wherein a differential amplifier computes a difference between the sensor outputs representing the position of the actuator arm, and the sum of the sensor outputs used to control an intensity of the light.

In one embodiment, the output of the light sensitive sensors 26 is used to adjust the intensity of the light emitted by the light source in an automatic gain controlled (AGC) loop. FIG. 5A shows an embodiment of the present invention wherein a differential amplifier 28 computes a difference between a first amount of light detected by the first sensor 26A and a second amount of light detected by the second sensor 26B, wherein the difference 30 represents the position of the actuator arm 8. Also in the embodiment of FIG. 5A, the differential amplifier 28 computes a sum 32 of the first amount of light detected by the first sensor 26A and the second amount of light detected by the second sensor 26B, wherein an intensity of the light emitted by the light source is controlled in response to the sum 32 in an AGC loop.

Figure 5B:
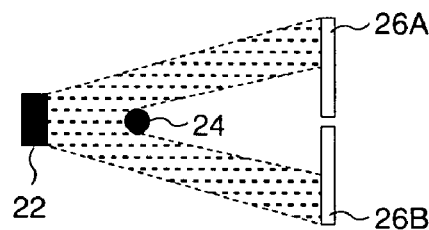
FIGS. 5B–5D illustrate how the amount of light each sensor detects changes relative to the position of the actuator arm according to an embodiment of the present invention.
Figure 5C:
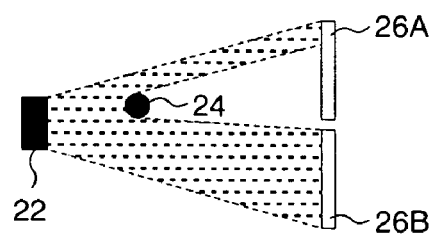
Figure 5D:
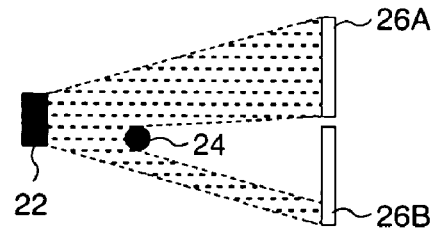

FIGS. 5B–5D correspond to FIGS. 4B–4D and illustrate how the position of the opaque element 24 changes to control the amount of light each light sensitive sensor detects relative to the position of the actuator arm 8. FIG. 5B shows that both light sensitive sensors 26A and 26B receive the same amount of light when the actuator arm 8 is near the middle of its stroke, FIG. 5C shows that bottom sensor 26B receives more light as the actuator arm 8 moves toward the OD, and FIG. 5D shows that the top sensor 26A receives more light as the actuator moves toward the ID. The difference between the amount of light each sensor detects therefore represents the position of the actuator arm 8.

Figure 6A:
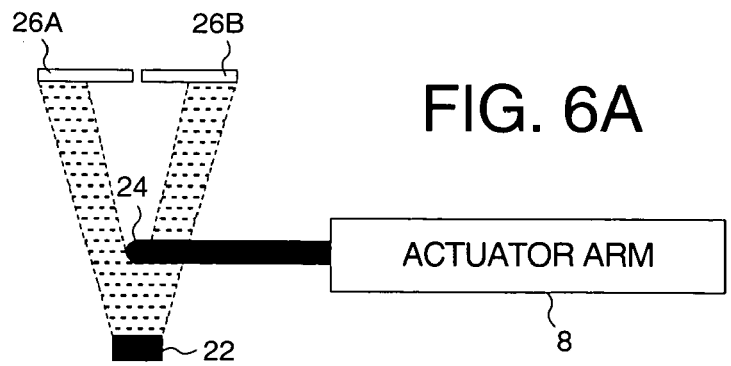
FIGS. 6A–6D illustrate an alternative embodiment of the present invention wherein the light source and light sensitive sensors are aligned vertically with respect to the surface of the disk.
Figure 6B:
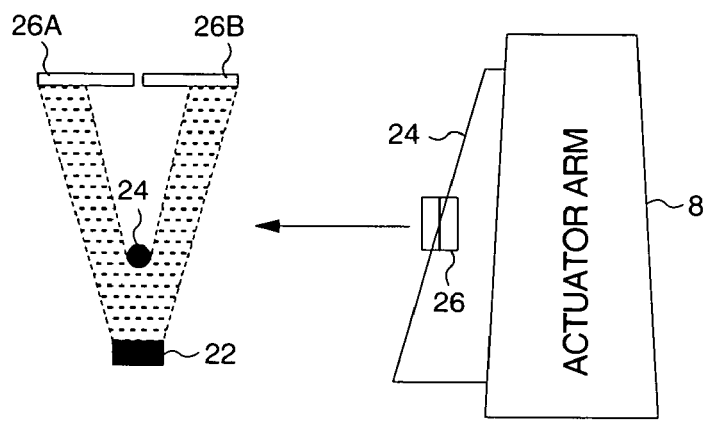
Figure 6C:
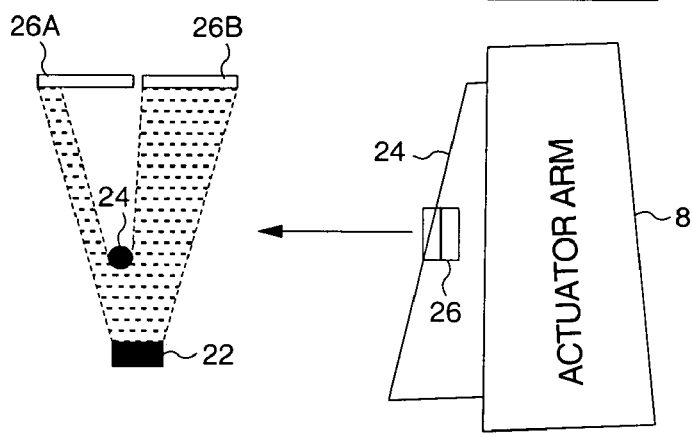
Figure 6D:
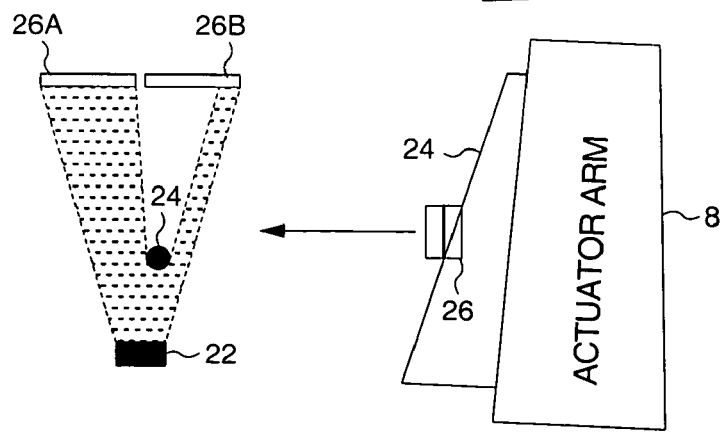

Any suitable configuration for the light source and light sensitive sensors may be employed in the embodiments of the present invention. FIG. 6A shows an alternative embodiment of the present invention wherein the light source (e.g., LED 22) and light sensitive sensors 26A and 26B are aligned substantially vertically with respect to the disk 2 (and planar surface of the actuator arm 8). FIGS. 6B–6D illustrate how the amount of light each light sensitive sensor 26A and 26B detects changes with the changing position of the actuator arm 8. FIGS. 6B–6D also illustrate an alternative shape for the opaque element 24, however, any suitable shape may be employed.

Figure 7A:
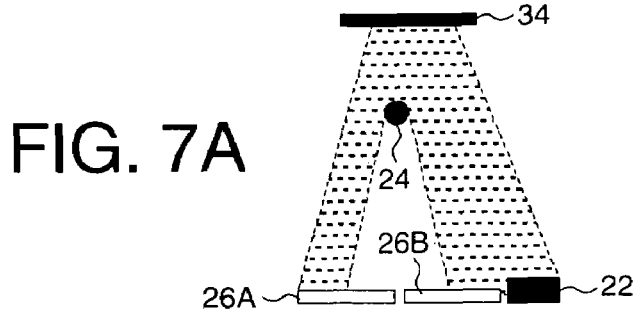
FIG. 7A illustrates an embodiment of the present invention wherein the light source comprises a light emitting device and a mirror.
Figure 7B:
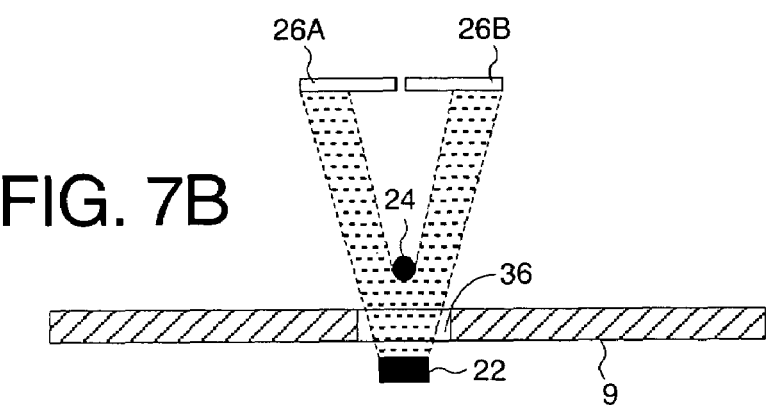
FIG. 7B shows an embodiment of the present invention wherein the HDA comprises a window, wherein the light passes through the window.
Figure 7C:
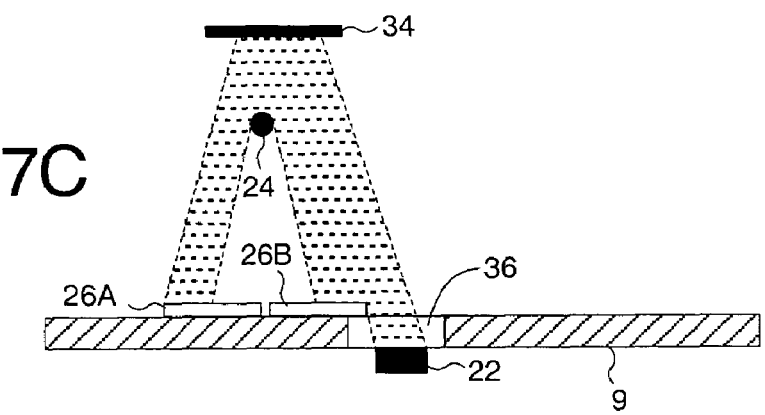
FIG. 7C shows an embodiment of the present invention wherein the light sensitive sensors are located inside the HDA.
Figure 7D:
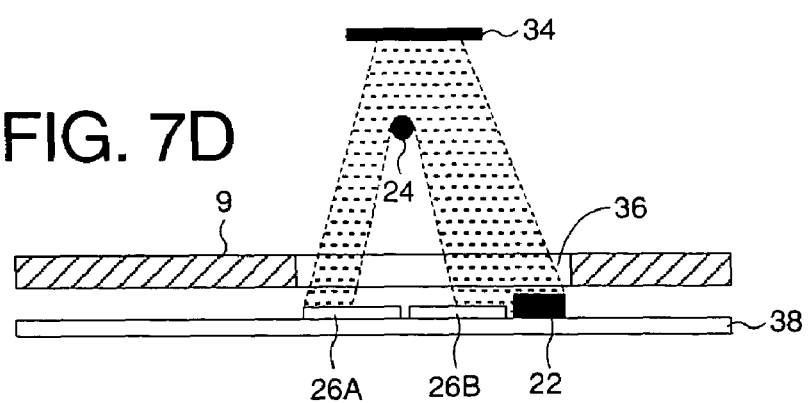
FIG. 7D shows an embodiment of the present invention wherein the light source and light sensitive sensors are mounted on a printed circuit board outside the HDA.

FIG. 7A illustrates another alternative configuration for the light source and light sensitive sensors. In this embodiment, the light source comprises a light emitting device 22 (e.g., an LED) and a mirror 34 for reflecting the light toward the light sensitive sensors 26A and 26B. FIG. 7B shows yet another configuration wherein the base 9 of the HDA comprises a window 36, and the light emitted by the light emitting device 22 passes through the window 36. This allows the light emitting device 22 to be located outside of the HDA. FIG. 7C shows an embodiment employing the mirror 34 of FIG. 7A and the window 36 of FIG. 7B, wherein the light sensitive sensors 26A and 26B are located inside the HDA. FIG. 7D shows an embodiment wherein both the light emitting device 22 and the light sensitive sensors 26A and 26B are mounted on a printed circuit board 38 located outside the HDA. In this embodiment, the light passes through the window 36, reflects off of the mirror 34, and then passes back through the window 36.

Figure 8:
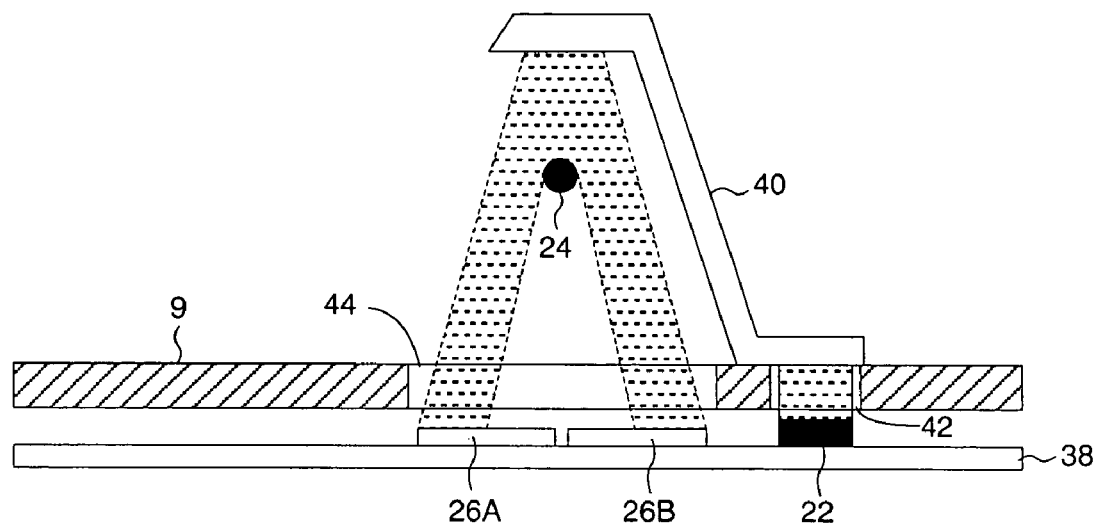
FIG. 8 shows an embodiment of the present invention wherein the light source comprises a light pipe, and the HDA comprises two windows.

FIG. 8 shows yet another embodiment of the present invention wherein the light source comprises a light emitting device 22 and a suitable light pipe 40 (e.g., a fiber optic). The light emitted by the light emitting device 22 passes through a first window 42 in the base 9 of the HDA, and is directed from one end of the light pipe 40 to the other end. The light then shines toward the light sensitive sensors 26A and 26B with appropriate shading by the opaque element 24. In this embodiment, the light passes through a second window 44 in the HDA before reaching the light sensitive sensors 26A and 26B located outside of the HDA.

Figure 9A:
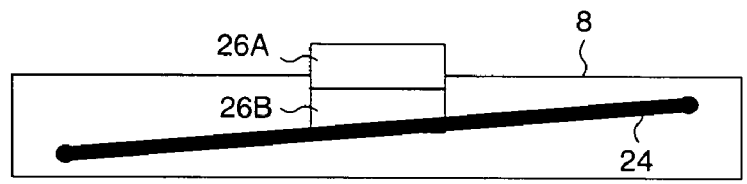
FIGS. 9A–9C illustrate an alternative embodiment of the present invention wherein the opaque element controls an amount of light one of the light sensitive sensors detects.
Figure 9B:
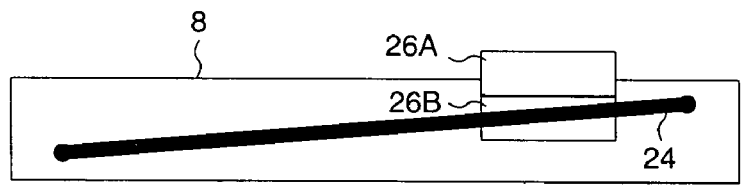
Figure 9C:
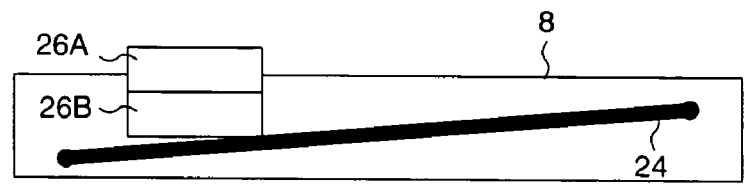

FIGS. 9A–9C illustrate another embodiment of the present invention wherein the opaque element 24 is configured to control the amount of light received only by the bottom sensor 26B. When the actuator arm 8 is near the middle of its stroke, as shown in FIG. 9A, the opaque element covers a predetermined area of the bottom sensor 26B. As the actuator arm 8 rotates toward the OD as shown in FIG. 9B, more of the opaque element 24 covers the bottom sensor 26B, and as the actuator arm 8 rotates toward the ID as shown in FIG. 9C, less of the opaque element 24 covers the bottom sensor 26B. In this embodiment, the output from both light sensitive sensors 26A and 26B may be used to control the intensity of the light in an AGC loop, for example, using the differential amplifier 28 shown in FIG. 5A.

In one embodiment, the optical sensor 20 for detecting the position of the actuator arm 8 is calibrated for each disk drive to compensate for manufacturing tolerances. Any suitable technique may be employed to calibrate the optical sensor 20, such as positioning the actuator arm 8 to a known position and measuring the output of the light sensitive sensors 26. In one embodiment, the actuator arm 8 is pressed against a crash stop (e.g., at the OD or ID of its stroke) in order to calibrate the optical sensor 20. In another embodiment, embedded servo sectors are recorded on the surface of the disk 2 to define a number of radially spaced, concentric servo tracks, and the position of the actuator arm 8 is detected relative to the location of the head 6 with respect to the servo tracks. For example, the actuator arm 8 may be rotated by the VCM until the head 6 detects the middle servo track on the surface of the disk 2. The difference between the sensor outputs represents a DC offset that is then subtracted from the detected position of the actuator arm 8.

The optical sensor 20 may be employed in any suitable manner to facilitate operation of the disk drive. In one embodiment, the optical sensor 20 is used to position the actuator arm 8 during normal operation of the disk drive to position the head 6 over a target location of the disk 2 during write/read operations. In another embodiment, the optical sensor 20 may be used to detect a velocity of the actuator arm 8 to implement a velocity controlled feedback system, for example, while parking the actuator arm 8 during a power failure mode. In yet another embodiment, the optical sensor 20 may be used in a position or velocity controlled feedback system to implement a ramp load/unload operation wherein the actuator arm 8 is parked on a ramp located at an outer periphery of the disk 2.

I claim:

1. A disk drive comprising:
   (a) a disk;
   (b) an actuator arm;
   (c) a head coupled to the actuator arm;
   (d) a base; and
   (e) an optical sensor operable to detect an absolute position of the actuator arm over a path of travel from a first radial location near an inner diameter of the disk to a second radial location near an outer diameter of the disk, the optical sensor comprising:
      a light source that is stationary relative to the base;
      a plurality of light sensitive sensors positioned to receive light from the light source; and
      a substantially opaque element positioned between the light source and the light sensitive sensors configured to control an amount of light at least one of the plurality of light sensitive sensors detects relative to the absolute position of the actuator arm.

2. The disk drive as recited in claim 1, wherein:
(a) the opaque element is coupled to the actuator arm; and
(b) the light sensitive sensors are stationary relative to the base.

3. The disk drive as recited in claim 2, wherein the opaque element comprises a linear element having a sloping angle with respect to the actuator arm.

4. The disk drive as recited in claim 1, further comprising control circuitry for adjusting an intensity of the light in response to the light sensitive sensors.

5. The disk drive as recited in claim 1, wherein:
(a) the plurality of light sensitive sensors comprise a first sensor and a second sensor, and
(b) the disk drive further comprises a differential amplifier operable to compute a difference between a first amount of light detected by the first sensor and a second amount of light detected by the second sensor, wherein the difference represents the absolute position of the actuator arm.

6. The disk drive as recited in claim 5, wherein:
(a) the differential amplifier is further operable to compute a sum of the first amount of light detected by the first sensor and the second amount of light detected by the second sensor; and
(b) an intensity of the light is controlled in response to the sum.

7. The disk drive as recited in claim 1, wherein the light sensitive sensors and opaque element are aligned substantially horizontally with respect to a surface of the disk.

8. The disk drive as recited in claim 1, wherein the light sensitive sensors and opaque element are aligned substantially vertically with respect to a surface of the disk.

9. The disk drive as recited in claim 1, wherein:
(a) the disk, head, and actuator arm are enclosed in a head disk assembly (HDA);
(b) the HDA comprises the base, a cover, and a window; and
(c) the light passes through the window.

10. The disk drive as recited in claim 9, wherein the light sensitive sensors are located inside the HDA.

11. The disk drive as recited in claim 9, wherein the light sensitive sensors are located outside the HDA.

12. The disk drive as recited in claim 1, wherein the light source comprises a light emitting device and a mirror.

13. The disk drive as recited in claim 1, wherein the light source comprises a light pipe.

14. The disk drive as recited in claim 1, wherein the substantially opaque element is configured to control an amount of light a single one of the plurality of light sensitive sensors detects relative to the absolute position of the actuator arm.

15. The disk drive as recited in claim 14, wherein:
(a) the plurality of light sensitive sensors comprise a first sensor and a second sensor;
(b) the substantially opaque element is configured to control an amount of light the first sensor detects relative to the absolute position of the actuator arm; and
(c) the disk drive further comprises a differential amplifier operable to compute a difference between a first amount of light detected by the first sensor and a second amount of light detected by the second sensor, wherein the difference represents the absolute position of the actuator arm.

16. The disk drive as recited in claim 15, wherein:
(a) the differential amplifier is further operable to compute a sum of the first amount of light detected by the first sensor and the second amount of light detected by the second sensor; and
(b) an intensity of the light is controlled in response to the sum.

17. A method of detecting an absolute position of an actuator arm over a path of travel from a first radial location near an inner diameter of a disk to a second radial location near an outer diameter of the disk in a disk drive, the disk drive comprising the disk, the actuator arm, a head coupled to the actuator arm, and a base, the method comprising the steps of:
(a) generating light from a light source that is stationary relative to the base;
(b) detecting the light using a plurality of light sensitive sensors; and
(c) using an opaque element positioned between the light source and the light sensitive sensors to control an amount of light at least one of the plurality of light sensitive sensors detects relative to the absolute position of the actuator arm.

18. The method as recited in claim 17, wherein:
(a) the opaque element is coupled to the actuator arm; and
(b) the light sensitive sensors are stationary relative to the base.

19. The method as recited in claim 18, wherein the opaque element comprises a linear element having a sloping angle with respect to the actuator arm.

20. The method as recited in claim 17, further comprising the step of adjusting an intensity of the light in response to the light sensitive sensors.

21. The method as recited in claim 17, wherein:
(a) the plurality of light sensitive sensors comprise a first sensor and a second sensor; and
(b) the method further comprises the step of generating a difference between a first amount of light detected by the first sensor and a second amount of light detected by the second sensor, wherein the difference represents the absolute position of the actuator arm.

22. The method as recited in claim 21, further comprising the steps of:
(a) generating a sum of the first amount of light detected by the first sensor and the second amount of light detected by the second sensor; and
(b) controlling an intensity of the light in response to the sum.

23. The method as recited in claim 17, wherein the light sensitive sensors and opaque element are aligned substantially horizontally with respect to a surface of the disk.

24. The method as recited in claim 17, wherein the light sensitive sensors and opaque element are aligned substantially vertically with respect to a surface of the disk.

25. The method as recited in claim 17, wherein:
(a) the disk, head, and actuator arm are enclosed in a head disk assembly (HDA);
(b) the HDA comprises the base, a cover, and a window; and
(c) the method further comprises the step of passing the light through the window.

26. The method as recited in claim 25, wherein the light sensitive sensors are located inside the HDA.

27. The method as recited in claim 25, wherein the light sensitive sensors are located outside the HDA.

28. The method as recited in claim 17, wherein the substantially opaque element is used to control an amount of light a single one of the plurality of light sensitive sensors detects relative to the absolute position of the actuator arm.

29. The method as recited in claim 28, wherein:
   (a) the plurality of light sensitive sensors comprise a first sensor and a second sensor;
   (b) the substantially opaque element is used to control an amount of light the first sensor detects relative to the absolute position of the actuator arm; and
   (c) the method further comprises the step of generating a difference between a first amount of light detected by the first sensor and a second amount of light detected by the second sensor, wherein the difference represents the absolute position of the actuator arm.

30. The method as recited in claim 29, further comprising the steps of:
   (a) generating a sum of the first amount of light detected by the first sensor and the second amount of light detected by the second sensor; and
   (b) controlling an intensity of the light in response to the sum.

* * * * *